(12) United States Patent
Kim

(10) Patent No.: US 10,267,021 B2
(45) Date of Patent: Apr. 23, 2019

(54) ANTIFREEZING APPARATUS

(71) Applicant: SUDO PREMIUM ENGINEERING CO., LTD., Seoul (KR)

(72) Inventor: Choon Sik Kim, Seoul (KR)

(73) Assignee: SUDO PREMIUM ENGINEERING CO., LTD., Seoul (KR)

( * ) Notice: Subject to any disclaimer, the term of this patent is extended or adjusted under 35 U.S.C. 154(b) by 0 days.

(21) Appl. No.: 15/579,227

(22) PCT Filed: Jun. 8, 2016

(86) PCT No.: PCT/KR2016/006076
§ 371 (c)(1),
(2) Date: Dec. 4, 2017

(87) PCT Pub. No.: WO2016/200152
PCT Pub. Date: Dec. 15, 2016

(65) Prior Publication Data
US 2018/0179741 A1 Jun. 28, 2018

(30) Foreign Application Priority Data

Jun. 9, 2015 (KR) .................. 10-2015-0081463

(51) Int. Cl.
*E03B 7/12* (2006.01)
*F16K 31/00* (2006.01)
*E03B 7/10* (2006.01)

(52) U.S. Cl.
CPC .............. *E03B 7/12* (2013.01); *F16K 31/002* (2013.01); *E03B 7/10* (2013.01); *Y10T 137/1353* (2015.04); *Y10T 137/5497* (2015.04)

(58) Field of Classification Search
CPC ............. F16K 31/002; Y10T 137/5497; Y10T 137/1353
See application file for complete search history.

(56) References Cited

U.S. PATENT DOCUMENTS 4,296,770 A * 10/1981 Rice ..................... G05D 23/023
                                                                    137/62
4,356,833 A * 11/1982 Mayfield, Jr. ........... F16L 55/00
                                                                    137/62

(Continued)

FOREIGN PATENT DOCUMENTS

JP          2001-330169 A       11/2001
KR    10-2015-0026084 A          3/2015

OTHER PUBLICATIONS

International Search Report in corresponding International Application No. PCT/KR2016/006076, dated Sep. 2, 2016.

*Primary Examiner* — Eric Keasel
*Assistant Examiner* — Kevin R Barss
(74) *Attorney, Agent, or Firm* — Bacon & Thomas, PLLC

(57) ABSTRACT

An anti-freezing apparatus comprises: a main block including an accommodation space and a water inlet at one side thereof to communicate with the accommodation space; a temperature sensitive member provided in the accommodation space and having one end for opening and closing the water inlet, the length of the temperature sensitive member variable due to expansion or contraction according to changes in temperature; an elastic member installed between the temperature sensitive member and the main block; a connecting rod connected to the other end of the temperature sensitive member; a locking part having opposite ends locked in a locking protrusion formed in the accommodation space and having a through-hole through which water passes; and an adjustment part coupled to the tip end of the connecting rod and rotatably screw-coupled to the locking part. The elastic member applies an elastic force to the temperature sensitive member to close the water inlet.

10 Claims, 5 Drawing Sheets

(56) References Cited

U.S. PATENT DOCUMENTS

| | | | | |
|---|---|---|---|---|
| 4,508,132 | A * | 4/1985 | Mayfield, Jr. | F16L 55/00 137/468 |
| 4,638,828 | A * | 1/1987 | Barrineau, Sr. | E03B 7/12 137/62 |
| 4,815,491 | A * | 3/1989 | Pirkle | E03B 7/10 137/315.01 |
| 4,852,601 | A * | 8/1989 | Chamberlin | E03B 7/10 137/62 |
| 4,883,082 | A * | 11/1989 | Pirkle | E03B 7/10 137/315.01 |
| 6,029,686 | A * | 2/2000 | Pirkle | F16K 31/002 137/315.25 |
| 7,377,286 | B2 * | 5/2008 | King, Jr. | E03B 7/12 137/1 |
| 7,681,804 | B2 * | 3/2010 | Lockhart | F16K 31/002 137/495 |
| 8,327,867 | B2 * | 12/2012 | Caleffi | E03B 7/12 137/62 |
| 9,410,536 | B2 * | 8/2016 | Lamb | F03G 7/06 |

\* cited by examiner

ANTIFREEZING APPARATUS

TECHNICAL FIELD

The present invention relates to an anti-freezing apparatus and, more particularly, an anti-freezing apparatus which is installed in tap water-related equipment such as a faucet, a water pipe or a water meter and which is capable of preventing water from being frozen and adjusting a valve opening temperature.

BACKGROUND

In general, various measures are tried to prevent a water meter from being frozen and burst in winter.

For example, in the case of a water meter exposed to the outside, it is wrapped with a heat insulating material such as Styrofoam or the like to prevent the water meter from being frozen. In the case of a water meter accommodated in a protection box, it is covered with a heat insulating material. Then, the protection box is filled with rice husks, old clothes, sawdust or the like, thereby thermally insulating the water meter from an ambient air and preventing the water meter from being frozen.

However, such a method cannot be a positive choice for preventing a water meter from being frozen. Even if the water meter is thermally insulated in this manner, when the temperature drops significantly, the water meter may be frozen and burst.

On the other hand, as another method for preventing a water meter from being frozen, a faucet valve in a house may be opened so that tap water in a water pipe can continuously flow without being stagnant, thereby preventing a water meter from being frozen.

However, in such a method, if the faucet valve is excessively opened due to erroneous adjustment of a valve opening amount, a large amount of water may be wasted. If the opening degree of the faucet valve is too small, the water meter may be frozen.

A user who exists indoors is difficult to accurately know the external temperature and may open a faucet even at a temperature at which a water meter is not frozen. Thus, water may be excessively wasted. If water continues to flow through a faucet, a user may unconsciously close a faucet valve, as a result of which a water meter may be frozen.

SUMMARY

Embodiments of the present invention provide an anti-freezing apparatus capable of automatically opening a valve at a temperature at which the tap water existing in tap water-related equipment such as a faucet, a water pipe or a water meter is frozen, allowing the tap water to be discharged to the outside, and consequently preventing the tap water-related equipment from being frozen.

Furthermore, embodiments of the present invention provide an anti-freezing apparatus capable of enabling a user to manually adjust an opening temperature of a valve for discharging tap water when there is a freezing risk, preventing tap water from being unnecessarily wasted, and enhancing the reliability of operation performance.

In accordance with one embodiment of the present invention, there is provided an anti-freezing apparatus including: a main block having an accommodation space formed therein and having a water inlet at one side thereof and a water outlet at the other side thereof so as to communicate with the accommodation space; a temperature sensitive member which has one side thereof provided in the accommodation space so as to open and close the water inlet and which is expanded or contracted in response to a temperature change so that the length of the temperature sensitive member is changed; a first elastic member installed between the temperature sensitive member and the main block and configured to elastically bias the temperature sensitive member in a direction to close the water inlet; a connecting rod connected to the other end of the temperature sensitive member so as to protrude from the temperature sensitive member; a locking part provided in the accommodation space and having a water passage hole through which water flows; and a setting adjustment part coupled to an end of the connecting rod and threadedly coupled to the locking part in a rotatable manner.

Further, a sealing member may be installed at the one end of the temperature sensitive member to enhance sealability against the water inlet.

Furthermore, the setting adjustment part and the connecting rod may be coupled through a bearing so that a torque of the setting adjustment part is not transmitted to the connecting rod.

In addition, a second elastic member may be installed between the locking part and the main block and configured to elastically bias the locking part toward a locking shoulder formed in the accommodation space.

Moreover, The water outlet may be formed in a cover part removably attached to the main block.

Further, a flange portion may be provided on an outer circumferential surface of the temperature sensitive member so that the first elastic member can be easily coupled to the temperature sensitive member.

According to the embodiments of the present invention, the valve is automatically opened before the tap water is frozen in winter, allowing the tap water to be discharged to the outside so that the tap water can flow without being stagnant. This makes it possible to prevent the tap water-related equipment such as a faucet, a water pipe or a water meter from being frozen.

DETAILED DESCRIPTION

Figure 1:
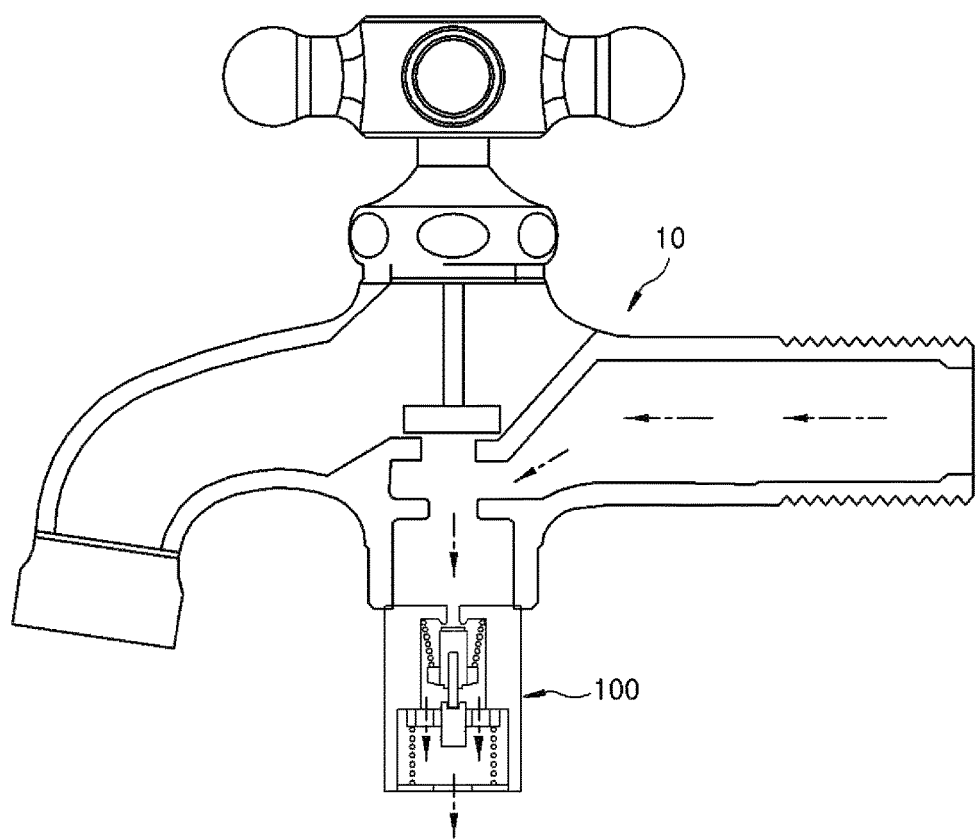
FIG. 1 is a side view showing a faucet in which an anti-freezing apparatus according to an embodiment of the present invention is installed.

Hereinafter, configurations and operations of embodiments will be described in detail with reference to the accompanying drawings. The following description is one of various patentable aspects of the present invention and may form a part of the detailed description of the present invention.

However, in describing the present invention, detailed descriptions of known configurations or functions that make the present invention obscure may be omitted.

The present invention may be variously modified and may include various embodiments. Specific embodiments will be exemplarily illustrated in the drawings and described in the detailed description of the embodiments. However, it should be understood that they are not intended to limit the present invention to specific embodiments but rather to cover all modifications, similarities, and alternatives which are included in the spirit and scope of the present invention.

The terms used herein, including ordinal numbers such as "first" and "second" may be used to describe, and not to limit, various components. The terms simply distinguish the components from one another.

Specific terms used in the present application are used simply to describe specific embodiments without limiting the present invention. An expression used in the singular encompasses the expression of the plural, unless it has a clearly different meaning in the context.

Hereinafter, one embodiment of the present invention will be described in detail with reference to the accompanying drawings.

Figure 2:
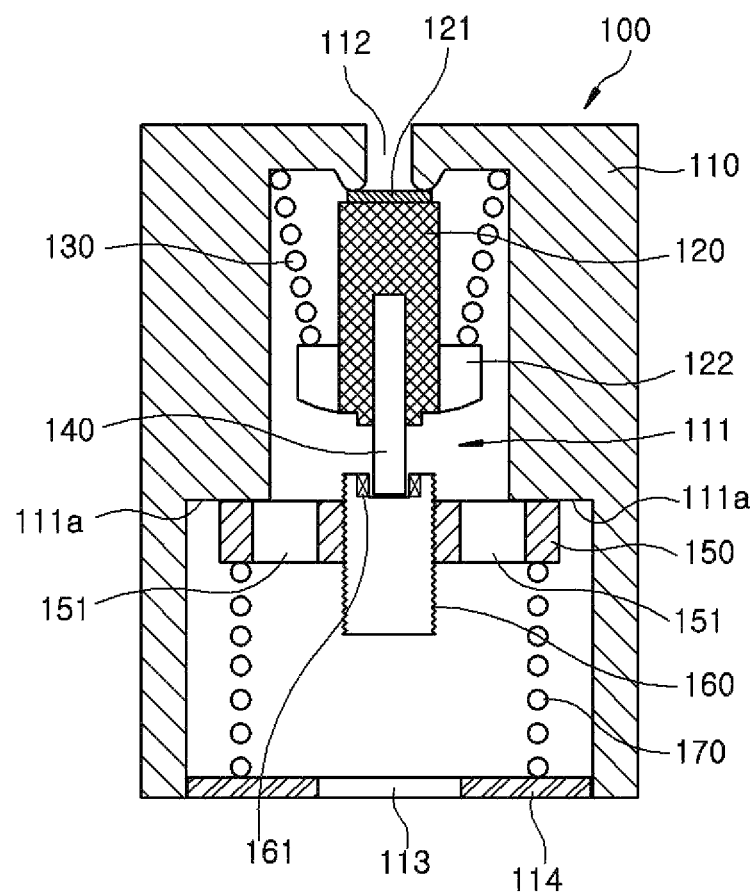
FIG. 2 is a configuration view showing an anti-freezing apparatus according to an embodiment of the present invention.

FIG. 1 is a side view showing a faucet in which an anti-freezing apparatus according to an embodiment of the present invention is installed. FIG. 2 is a configuration view showing an anti-freezing apparatus according to an embodiment of the present invention.

An anti-freezing apparatus 100 according to an embodiment of the present invention is installed in a faucet 10 as shown in FIG. 1 to prevent the faucet 10 from being frozen and burst even when the ambient temperature drops in winter and the temperature of tap water in the faucet 10 drops to a freezing point or less. The anti-freezing apparatus 100 is automatically opened to discharge tap water before the temperature of tap water in the faucet 10 drops to a freezing point or less, thereby preventing the tap water from being frozen inside the faucet 10.

Although FIG. 1 illustrates an example in which the anti-freezing apparatus 100 according to the present embodiment is installed in the faucet 10, the application of the anti-freezing apparatus 100 is not necessarily limited to the faucet 10. The anti-freezing apparatus 100 may be applied to a water pipe or other equipment whose freezing is to be prevented.

Referring to FIG. 2, the anti-freezing apparatus 100 according to the present embodiment may include a main block 110, a temperature sensitive member 120, a first elastic member 130, a connecting rod 140, a locking part 150 and a setting adjustment part 160.

The main block 110 forms an overall outer shell of the anti-freezing apparatus 100 according to the present embodiment. The respective components mentioned above are disposed in the main block 110. The main block 110 may be installed in the faucet 10, the water pipe or other places.

A predetermined accommodation space 111 is formed in the main block 110. A water inlet 112 and a water outlet 113 may be respectively formed on one side and the other side of the main block 110 so as to communicate with the accommodation space 111.

Water may be introduced into the accommodation space 111 formed in the main block 110 through the water inlet 112. The water introduced into the accommodation space 111 may be discharged to the outside of the main block 110 through the water outlet 113.

In this regard, the water outlet 113 may be formed in a cover part 114 provided independently of the main block 110. The cover part 114 may be removably attached to the main block 110 so that other components can be installed in the accommodation space 111. If necessary, the cover part 114 may be removed from the main block 110 to open the other side of the main block 110.

Thus, when other components are installed in the main block 110 or when the respective components need to be replaced, repaired or adjusted, the cover part 114 may be removed from the main block 110.

Furthermore, the temperature sensitive member 120 is accommodated in the accommodation space 111 so that one end thereof can open and close the water inlet 112. The temperature sensitive member 120 is configured to be expanded or contracted in response to a temperature change so that the length thereof can be changed.

The temperature sensitive member 120 has a property of being expanded or contracted in response to a change in an external temperature (an air temperature or a water temperature). The temperature sensitive member 120 may be made of various materials that can be expanded and contracted in response to a temperature change.

Specifically, in the present embodiment, a temperature sensitive wax used for a thermostat of a motor vehicle is used as the temperature sensitive member 120. However, other materials may be used as the temperature sensitive member 120. The temperature sensitive wax is widely known in the art and therefore detailed descriptions thereof will be omitted.

The temperature sensitive member 120 has a property of being contracted at a predetermined threshold temperature or less. The threshold temperature may be 15° C. to 30° C. In reality, while the freezing point of water is 0° C., the threshold temperature at which the temperature sensitive member 120 begins to be contracted may be 1.5° C. to 3.0° C. As a result, the water in the faucet 10 or the water pipe is discharged to the outside through the water inlet 112 and the water outlet 113 before the water is frozen. Thus, the water in the tap water-related equipment such as a faucet, a tap water pipe or a water meter is allowed to flow without being stagnant. This makes it possible to prevent the water from being frozen in the tap water-related equipment.

In this regard, a sealing member 121 for enhancing sealability against the water inlet 112 may be installed at one end of the temperature sensitive member 120. The sealing member 121 may be made of a rubber material. When the temperature sensitive member 120 closes the water inlet 112, the sealing member 121 enhances the closing action so that the water is not leaked. This makes it possible to prevent the water from being wasted due to water leakage.

Meanwhile, the first elastic member 130 is installed between the temperature sensitive member 120 and the main block 110 and is configured to elastically bias the temperature sensitive member 120 in such a direction as to close the water inlet 112. A tension spring may be used as the first elastic member 130. A flange portion 122 may be provided on the outer circumferential surface of the temperature sensitive member 120 so that the first elastic member 130 can be easily coupled to the temperature sensitive member 120.

Unless the temperature sensitive member 120 is contracted, the water inlet 112 is closed by the temperature sensitive member 120 due to the biasing force of the first elastic member 130. Thus, the water is not leaked.

The connecting rod 140 is connected to the other end of the temperature sensitive member 120 and is configured to protrude from the other end surface of the temperature sensitive member 120 by a predetermined length.

The locking part 150 is configured to engage with a locking shoulder 111a formed in the accommodation space 111. Water passage holes 151 through which the water introduced into the accommodation space 111 from the water inlet 112 passes may be formed in the locking part 150.

The setting adjustment part 160 is fixed to the end of the connecting rod 140 protruding from the temperature sensitive member 120 and is threadedly coupled to the locking part 150 in a rotatable manner.

The setting adjustment part 160 is configured to be rotated by a user when such a need arises. If the setting adjustment part 160 is rotated, the setting adjustment part 160 moves by a predetermined amount in the longitudinal direction thereof due to the thread coupling structure while rotating with respect to the locking part 150. As a result, the setting adjustment part 160 pushes or pulls the connecting rod 140 to change the compression amount of the temperature sensitive member 120. This makes it possible to change the temperature at which the water inlet 112 is opened.

For example, by rotating the setting adjustment part 160, it is possible to allow the water inlet 112 to be opened at 2° C. or 0° C. This will be described later again.

A bearing 161 may be installed between the setting adjustment part 160 and the connecting rod 140 to make sure that the torque of the setting adjustment part 160 is not transmitted to the connecting rod 140.

Thus, even if the setting adjustment part 160 is rotated, the torque is not transmitted to the connecting rod 140 due to the existence of the bearing 161. Only the displacement of the setting adjustment part 160 is transferred to the connecting rod 140. As a result, the setting adjustment part 160 pushes or pulls the connecting rod 140 to change the compression amount of the temperature sensitive member 120.

Figure 4:
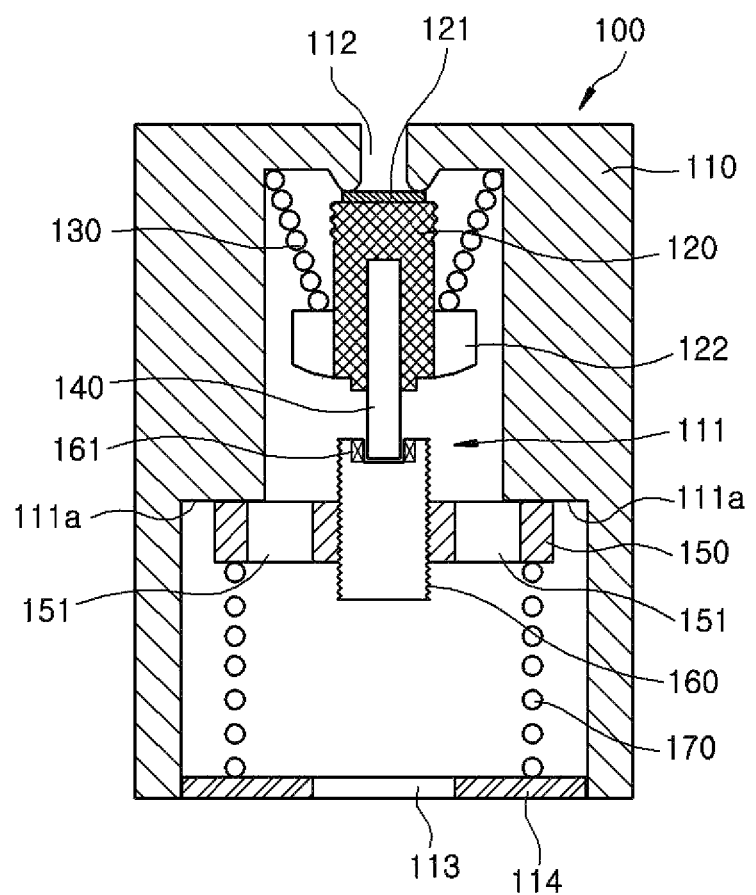
FIGS. 4 and 5 are views in which a setting adjustment part is set so that a water inlet is opened at a lower temperature than in FIGS. 2 and 3.
Figure 5:
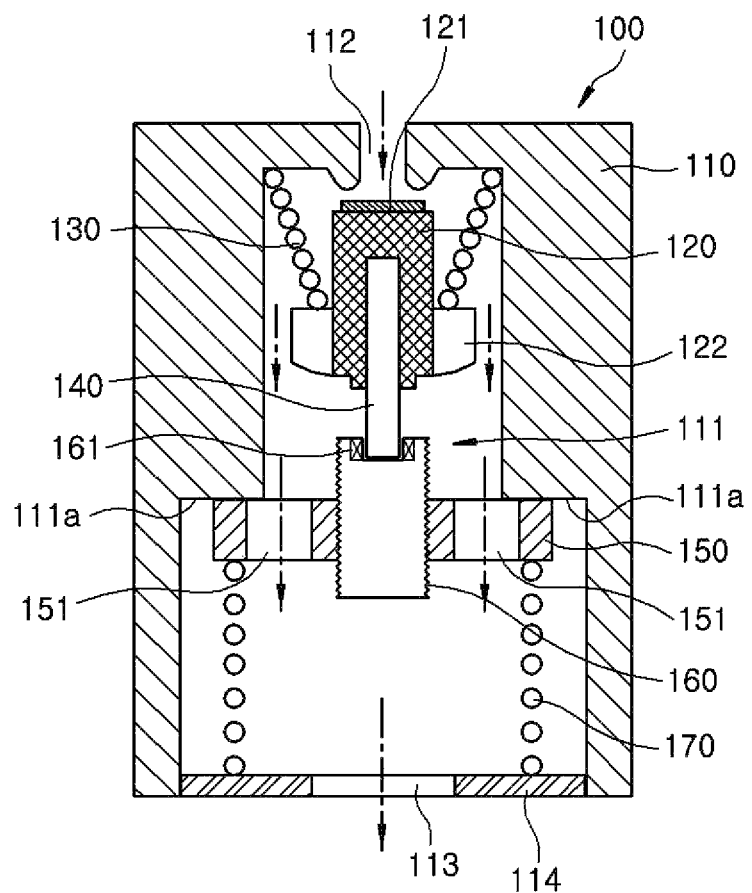

As the compression amount of the temperature sensitive member 120 increases in response to the rotation of the setting adjustment part 160, the temperature at which the water inlet 112 is opened decreases (see FIGS. 4 and 5).

A second elastic member 170 for applying a biasing force to the locking part 150 in such a direction that the locking part 150 engages with the locking shoulder 111a of the accommodation space 111 may be installed between the locking part 150 and the main block 110. Specifically, the second elastic member 170 may be elastically installed between the cover part 114 of the main block 110 and the locking part 150. A compression spring for applying a biasing force to the locking part 150 may be used as the second elastic member 170.

Hereinafter, the operation of the anti-freezing apparatus 100 according to the present embodiment will be described with reference to FIGS. 2 to 5.

Figure 3:
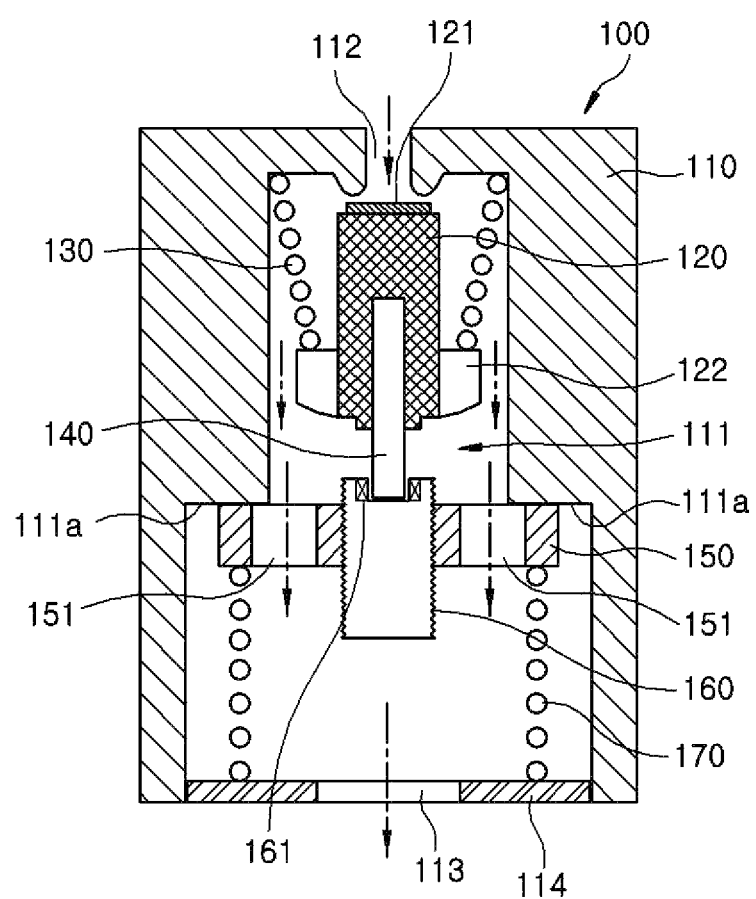
FIG. 3 is a view showing an operation state in which a temperature sensitive member is contracted in a state shown in FIG. 2 to open a water inlet.

FIGS. 2 and 3 are views showing a state in which the setting adjustment part 160 is set such that the water inlet 112 is opened at a predetermined temperature (e.g., about 2° C.). Referring to FIG. 2, the temperature sensitive member 120 is not contracted. Thus, the temperature sensitive member 120 closes the water inlet 112.

In this state, if the temperature gradually drops to, e.g., about 2° C., as shown in FIG. 3, the temperature sensitive member 120 begins to be contracted and the length of the temperature sensitive member 120 is reduced. As a result, the water inlet 112 closed by one end of the temperature sensitive member 120 begins to be opened.

In this regard, the other end of the temperature sensitive member 120 is connected to the locking part 150 through the setting adjustment part 160, and the locking part 150 is engaged with the locking shoulder 111a formed in the accommodation space 111 of the main block 110. Therefore, when the temperature sensitive member 120 is contracted, the other end of the temperature sensitive member 120 cannot move due to the engagement with the locking shoulder 111a, and one end of the temperature sensitive member 120 closing the water inlet 112 moves away from the water inlet 112, thereby opening the water inlet 112. As the water inlet 112 is opened, the water existing in the faucet 10 or the water pipe flows through the main block 110 and is discharged to the outside through the water outlet 113. Thus, the water flows without being stagnant. This makes it possible to prevent the water from being frozen.

On the other hand, FIGS. 4 and 5 are views showing a state in which the setting adjustment part 160 is set so that the water inlet 112 can be opened at a temperature (e.g., about 0° C.) lower than the temperature set in FIG. 2. Referring to FIG. 4, the setting adjustment part 160 is adjusted to further protrude toward the water inlet 112 as compared with FIG. 2. If a user rotates the setting adjustment part 160 in order to cause the setting adjustment part 160 to further protrude toward the water inlet 112, the protruding amount of the setting adjustment part 160 toward the water inlet 112 is increased due to the thread coupling structure of the setting adjustment part 160 and the locking part 150. As a result, the connecting rod 140 is pushed by the setting adjustment part 160 to press the temperature sensitive member 120, whereby the compression amount of the temperature sensitive member 120 increases.

If the compression amount of the temperature sensitive member 120 increases in this manner, the water inlet 112 is not opened even when the ambient temperature drops and reaches the threshold temperature of the temperature sensitive member 120.

In other words, if the ambient temperature reaches the threshold temperature of the temperature sensitive member 120, the contracting action of the temperature sensitive member 120 is started. However, since the temperature sensitive member 120 is compressed by the connecting rod 140 in an amount larger than the contraction amount, the water inlet 112 is not opened.

For example, in the state shown in FIG. 2, the water inlet 112 is opened when the ambient temperature reaches about 2° C. However, in the state in which the temperature sensitive member 120 is compressed as shown in FIG. 4, the water inlet 112 is not opened even when the ambient temperature reaches about 2° C. Only when the ambient temperature reaches a temperature (e.g., 0° C.) lower than about 2° C., the compression amount of the temperature sensitive member 120 is further increased and the water inlet 112 can be opened. Accordingly, the temperature at which the water inlet 112 is opened can be changed by adjusting the setting adjustment part 160.

While the present invention has been described above using the preferred embodiments, the scope of the present invention is not limited to the specific embodiments described above. A person having ordinary knowledge in the relevant technical field will be able to replace or modify the constituent elements. Such replacement or modification should be construed to fall within the scope of the present invention.

What is claimed is:

1. An anti-freezing apparatus, comprising:
   a main block having an accommodation space formed therein and a water inlet formed on one side thereof so as to communicate with the accommodation space;
   a temperature sensitive member accommodated in the accommodation space and configured to be expanded or contracted in response to a temperature change so that the length of the temperature sensitive member is changed and one end thereof opens and closes the water inlet;
a first elastic member installed between the temperature sensitive member and the main block and configured to elastically bias the temperature sensitive member in a direction to close the water inlet;
a connecting rod connected to the other end of the temperature sensitive member so as to protrude from the temperature sensitive member;
a locking part provided in the accommodation space and having a water passage hole through which water flows; and
a setting adjustment part coupled to an end of the connecting rod and threadedly coupled to the locking part in a rotatable manner,
wherein the setting adjustment part and the connecting rod are coupled through a bearing so that a torque of the setting adjustment part is not transmitted to the connecting rod.

2. The apparatus of claim 1, further comprising:
a sealing member installed at the one end of the temperature sensitive member to enhance sealability against the water inlet.

3. The apparatus of claim 1, further comprising:
a second elastic member installed between the locking part and the main block and configured to elastically bias the locking part toward a locking shoulder formed in the accommodation space.

4. The apparatus of claim 1, further comprising:
a cover part removably attached to the main block, the cover part having a water outlet communicating with the accommodation space.

5. The apparatus of claim 1, wherein the temperature sensitive member includes a flange portion configured to enable the first elastic member to be easily coupled to the temperature sensitive member.

6. An anti-freezing apparatus, comprising:
a main block having an accommodation space formed therein and a water inlet formed on one side thereof so as to communicate with the accommodation space;
a temperature sensitive member accommodated in the accommodation space and configured to be expanded or contracted in response to a temperature change so that the length of the temperature sensitive member is changed and one end thereof opens and closes the water inlet;
a first elastic member installed between the temperature sensitive member and the main block and configured to elastically bias the temperature sensitive member in a direction to close the water inlet;
a connecting rod connected to the other end of the temperature sensitive member so as to protrude from the temperature sensitive member;
a locking part provided in the accommodation space and having a water passage hole through which water flows;
a setting adjustment part coupled to an end of the connecting rod and threadedly coupled to the locking part in a rotatable manner; and
a second elastic member installed between the locking part and the main block and configured to elastically bias the locking part toward a locking shoulder formed in the accommodation space.

7. The apparatus of claim 6, further comprising:
a sealing member installed at the one end of the temperature sensitive member to enhance sealability against the water inlet.

8. The apparatus of claim 6, wherein the setting adjustment part and the connecting rod are coupled through a bearing so that a torque of the setting adjustment part is not transmitted to the connecting rod.

9. The apparatus of claim 6, further comprising:
a cover part removably attached to the main block, the cover part having a water outlet communicating with the accommodation space.

10. The apparatus of claim 6, wherein the temperature sensitive member includes a flange portion configured to enable the first elastic member to be easily coupled to the temperature sensitive member.

* * * * *